Dec. 23, 1969   R. J. BECK   3,485,110
NUT AND SCREW MECHANISM
Filed Aug. 21, 1968   2 Sheets-Sheet 1
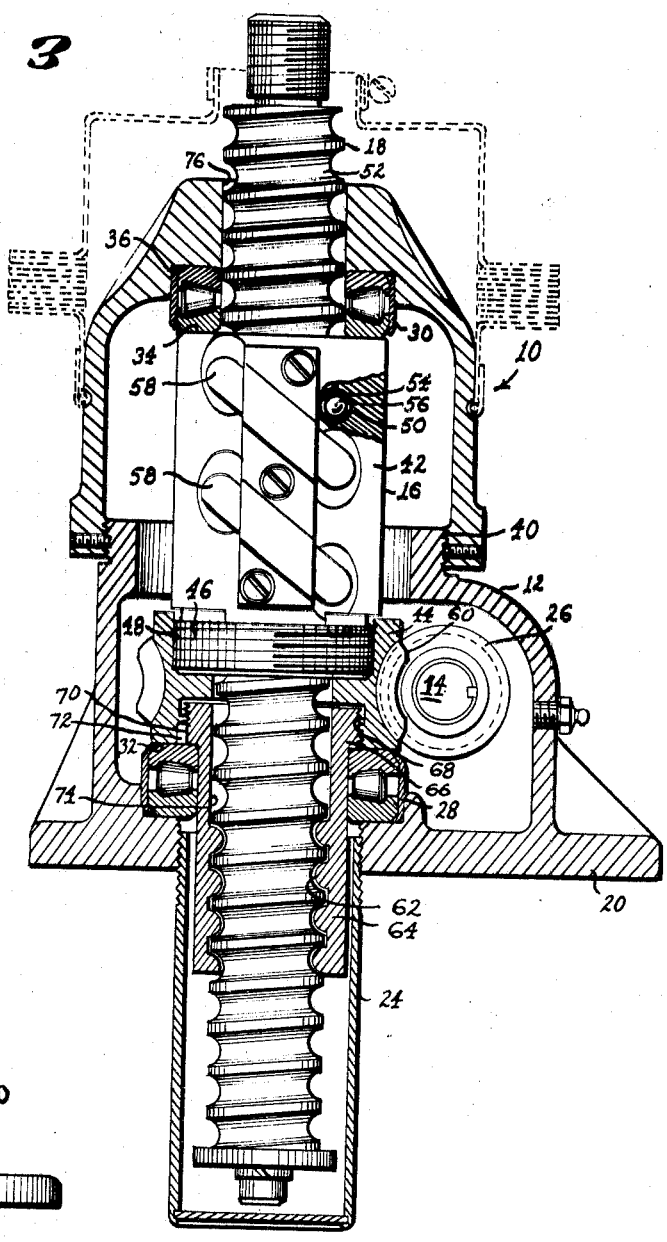
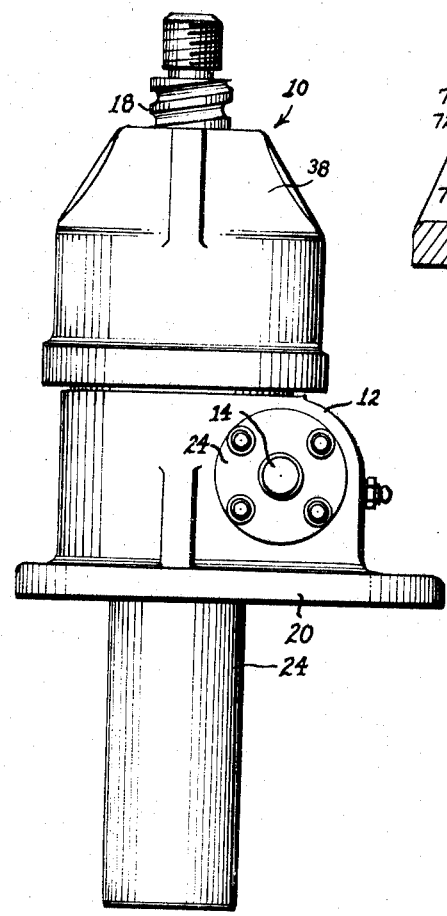
INVENTOR
ROBERT J. BECK
ATTORNEYS Dec. 23, 1969     R. J. BECK     3,485,110

NUT AND SCREW MECHANISM

Filed Aug. 21, 1968     2 Sheets-Sheet 2

INVENTOR
ROBERT J. BECK
BY Channing L. Richardson
Dalbert U. Shefte
ATTORNEY

United States Patent Office 3,485,110
Patented Dec. 23, 1969

3,485,110
NUT AND SCREW MECHANISM
Robert J. Beck, Charlotte, N.C., assignor to Duff-Norton Company, Inc., Charlotte, N.C., a corporation of North Carolina
Filed Aug. 21, 1968, Ser. No. 754,368
Int. Cl. F16h 1/08
U.S. Cl. 74—424.8
19 Claims

ABSTRACT OF THE DISCLOSURE

A nut and screw mechanism of the type having complementary grooves in the nut and screw members that form a helical cavity in which bearing elements are disposed for drivingly connecting the members. The nut member having a safety thread in the form of a helical rib aligned helically with and projecting into the screw member groove to provide a connection between the members upon failure of the connection provided by the bearing elements, the rib being disposed at a clearance with respect to the surface of the screw member during proper functioning of the bearing elements so as not to diminish the operating efficiency of the bearing element connection.

BACKGROUND OF THE INVENTION

The present invention relates to a safety feature incorporated in a nut and screw mechanism of the type that utilizes bearing elements disposed in complementary helical grooves of the nut and screw members of the mechanism to drivingly connect the members for transformation of rotational movement of one member into linear movement of the other member. A typical nut and screw mechanism of this type without the safety feature of the present invention is disclosed in relation to a jack mechanism in Beck U.S. Patent No. 3,178,958, issued Apr. 20, 1965. Mechanisms of this prior art type are characterized by a desirable high efficiency and a long wear life in comparison with conventional mechanisms in which the nut and screw members are connected directly by mating screw thread engagement, and these characteristics render the mechanisms of particular advantage in high speed applications. Further, not only do these mechanisms have a long wear life, but the wear normally develops as a progressive pitting of the bearing elements, which does not produce a corresponding increase in the clearance between the bearing elements and the nut and screw members and, therefore, does not result in the undesirable progressive increase in backlash that occurs as a result of thread wear in conventional mechanisms of the direct thread engagement type.

However, as there is no progressive increase in backlash to indicate the extent of wear, these bearing element type mechanisms are subject to immediate and complete breakdown without any prior indication when the bearing element connection fails, as by fracture of the bearing elements or escape of the bearing elements upon a rupture of the retaining structure. Because the nut and screw members are not connected except through the bearing elements, a failure of the bearing element connection will permit substantially free movement of the screw member within the nut member, thereby allowing the load to drop with a resultant risk of structural damage and personal injury, and with the mechanism being incapable of further operation.

This inherent possibility of unforewarned complete failure and the accompanying risk of serious damage and injury by a dropping of the load is eliminated by the safety feature of the present invention, which provides a direct connection between the nut and screw members upon failure of the bearing element connection so that support of the load will be maintained and the mechanism will be capable of continued operation. Furthermore, this safety feature is provided in a manner that importantly does not diminish the high operating efficiency of the bearing element connection during normal operation of the mechanism prior to failure of the bearing element connection, but does impose a substantially lower efficiency thereafter, thereby importantly providing an indication of the failure of the bearing element connection.

If desired, the present invention can be utilized to provide a direct engagement between the nut and screw members during normal operation of the mechanism in one direction only so as to eliminate any initial slight backlash that may be present in the bearing element connection, while maintaining the aforementioned clearance when the mechanism is operated in the other direction so as not to diminish the high operating efficiency during operation in this other direction, which would preferably be the direction in which the mechanism operates under greatest load. This one direction direct engagement can also be used to provide a no-back drag in some applications.

Many of the various types of prior art devices for eliminating backlash in nut and screw mechanisms would inherently incorporate a safety factor of sorts in that they include a double or split nut construction wherein the connection provided by one of the nuts or nut components would continue to function after the other nut or nut component connection fails, but they are not characterized by either the important normal clearance or the important subsequent difference in operating efficiency that is incorporated in the present invention.

A typical example of a prior art anti-backlash device is disclosed in McMullen U.S. Patent No. 3,323,777, issued June 6, 1967, which discloses a worm gear jack having a conventional worm gear that is connected through a direct thread connection to a lifting screw and having an anti-backlash nut also connected through a direct thread connection to the lifting screw, with the nuts being adjustable to eliminate backlash resulting from progressive thread wear. Neither of these connections are disposed at a clearance that permits functioning only when the other connection fails, and as both connections are of the same type an appreciable lessening of the operating efficiency would not result when one connection fails. Rather, upon failure of one connection the other connection would apparently continue to function at about the same efficiency and the failure would be noticed only at a later time when the nuts are adjusted in an attempt to eliminate backlash and it is found that, rather than eliminating backlash, the adjustment binds the mechanism so that it can no longer function.

SUMMARY OF THE INVENTION

Basically, the safety feature of the present invention is incorporated in a nut and screw mechanism of the type having a screw member formed with an exterior, helical groove, and a nut member having an interior, helical groove that complements the screw member groove to provide therewith a helical cavity in which bearing elements are retained for drivingly connecting the members to transform rotational movement of one of the members into linear movement of the other member. The nut member is further formed with an interior projection that is aligned with and projects into the screw member groove to provide a connection between the members upon failure of the bearing element connection, but which is disposed so that it is at a clearance with respect to the surface of the screw member during proper functioning of the bearing elements and, therefore, does not diminish the operating efficiency of the bearing element connection.

Thus, the high operating efficiency of the mechanism obtained by the bearing element connection is not adversely affected by the safety feature of the present invention during normal operation, and it is only after the bearing element connection has failed that the safety projection on the nut member engages the screw member to provide a connection between the members that prevents disengagement and permits continued operation, with the continued operation being at a substantially lesser efficiency, thereby providing a readily detectable indication of the failure of the bearing element connection.

As this safety feature involves only the incorporation of an interior projection in the nut member, it can readily be adapted to otherwise conventional nut and screw mechanisms without appreciable redesign, requiring at most merely an extension of the nut member to provide a surface on which the projection is formed. Further, as there is little or no increase in the clearance or backlash at the bearing element connection during operation and as the projection is disposed at a clearance with respect to the screw member, no adjustment of the projection disposition is required during operation so that once the mechanism has been assembled the projection will remain in proper disposition without further attention.

If desired, this nut member projection may be disposed for functioning as an anti-backlash device during normal operation of the mechanism. For this purpose the projection is disposed with the clearance at one side of the screw member groove so that the projection does not engage the screw member during operation of the mechanism in one direction, preferably the direction in which the mechanism is under greatest load, but is disposed closely adjacent the other side of the screw member groove for engagement of the screw member during operation of the mechanism in the other direction so as to minimize backlash when the mechanism reverses direction. The engagement of the projection with the screw member reduces the operating efficiency during operation of the mechanism in the direction when this engagement occurs, but because this is preferably the direction in which the mechanism is lightly loaded it does not diminish appreciably the overall high efficiency characteristic of the mechanism. This clearance arrangement can also be used to provide a no-back drag in some applications.

Preferably, the safety projection is formed as a helical rib spaced from the bearing element helical cavity and on an axial extension of the nut member, with the rib being helically aligned with and projecting into the screw member groove to provide a drive thread connection between the nut and screw members upon failure of the bearing element connection.

In the preferred embodiment, the nut and screw mechanism of the present invention is incorporated in a jack mechanism with the nut member being compositely formed to provide a nut component in which the bearing element groove is formed, and a gear component on which the projecting helical rib is formed, the gear component being further formed with an exterior, annular worm gear surface that is drivingly engaged by a worm formed on a drive shaft. The nut component is threadably connected to the gear component for rotation therewith to transform rotational movement of the drive shaft and nut member through the bearing element connection into linear movement of the screw member.

The threaded connection of the nut component and gear component permits initial axial adjustment of the components so that the helical rib can be properly positioned with respect to the helical bearing element cavity to dispose the rib at the aforementioned clearance with respect to the screw member groove, which, if desired, may be adjusted to dispose the rib for anti-backlash functioning in the manner described heretofore.

If desired, the gear component itself may be compositely formed with the safety rib provided on an axial extension that is threadably connected to the main body of the nut member gear component so that initial axial adjustment of the disposition of the rib can be obtained at the extension connection without having to adjust the relative position of the nut and gear components at their connection.

In addition, according to the present invention the gear component may be formed with an interior, annular, screw guiding and stabilizing surface of the type disclosed in the aforementioned Beck U.S. Patent No. 3,178,958 for the same purpose of guiding and stabilizing the screw member during normal functioning of the bearing element connection and which, in the present invention, is of particular advantage in stabilizing the screw member when the nut and screw members are connected only by the projecting rib after failure of the bearing element connection.

BRIEF DESCRIPTION OF THE DRAWINGS

FIG. 1 is an elevational view of a jack mechanism incorporating the preferred embodiment of the nut and screw mechanism of the present invention;

FIG. 3 is an enlarged vertical sectional view of the jack mechanism of FIG. 1;

DESCRIPTION OF THE PREFERRED EMBODIMENT

Figure 4:
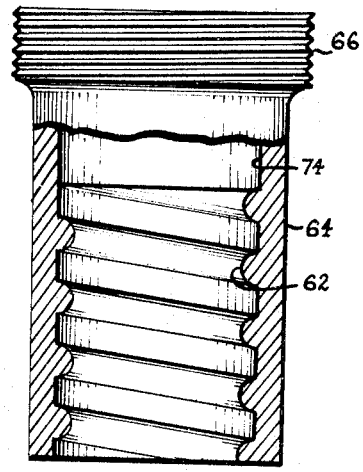
FIG. 4 is an enlarged vertical sectional view of the axial extension of the gear component of the jack mechanism of FIG. 3.

The preferred embodiment of the nut and screw mechanism of the present invention, as illustrated in the accompanying drawings, is incorporated in a jack mechanism 10, the main components of which are a housing 12, a worm shaft 14 mounted in the housing 12 for rotation about a horizontal axis, a composite nut member 16 mounted in the housing 12 and drivingly engaged by the worm shaft 14 for rotation about a vertical axis, and a screw member 18 extending vertically through the nut member 16 and housing 12 for vertical linear movement along the vertical axis of the nut member 16 in response to rotation thereof.

The housing 12 has a flat base portion 20 for mounting of the jack mechanism on a convenient supporting structure and through which the screw member 18 extends into a depending tubular sleeve 22 that is threaded into the base portion 20 to provide an enclosure for protecting and shielding the downwardly extending end of the screw member.

The worm shaft 14 is rotatably mounted in bearing plates 24 at opposite sides of the housing 12, from which it extends for connection to suitable drive means (not shown), and between which it is formed with a worm section 26 thereon within the housing 12 for driving engagement with the nut member 16.

The nut member 16 is mounted for rotation in proper operating position within the housing 12 by a pair of vertically spaced bearing rings 28 and 30 that are seated in the housing 12, with the lower bearing ring 28 seated in the base portion 20 of the housing 12 and supporting the nut member 16 at an annular, downwardly facing shoulder 32 near the bottom thereof, and with the upper bearing ring 30 seated on the top surface 34 of the nut member 16 and in an annular, downwardly facing recess 36 in a shell cap portion 38 of the housing 12, which shell cap portion 38 is attached to the remainder of the housing 12 by a threaded connection 40 that permits adjustment of the spacing between bearing rings 28 and 30 for proper operating retention of the nut member 16 therebetween.

The composite nut member 16 has a nut component 42 and a gear component 44 that are coaxially aligned and connected for unitary rotation. For this purpose the nut component 42 has an axially depending, exteriorly threaded extension 46 that is threadably seated in an annular, interiorly threaded recess 48 axially formed in the gear component 44. As illustrated in FIG. 3, the nut component extension 46 is fully seated in the gear component recess 48 so that the threads do not bear all of the load between the components.

The nut component 42 is a conventional ball nut of the type having an interior, helical groove 50 that complements the exterior, helical groove 52 of the screw member 18 to provide therewith a helical cavity 54 for the retention of bearing elements, such as bearing balls 56, therein, which balls 56 circulate through the helical cavity 54 and return tubes 58 that are mounted exteriorly on the nut member 16 and connect with spaced portions of the helical cavity 58 for confinement of the balls in recirculating paths for drivingly connecting the nut and screw members 16 and 18 to transform rotational movement of the nut member 16 into linear movement of the screw member 18 when rotation of the screw member 18 is prevented as by positive attachment to a load.

The gear component 44 is formed with an exterior, annular worm gear surface 60 that is in meshing engagement with the worm section 26 on the worm shaft 14 to transmit rotation of the drive shaft 14 into rotation of the nut member 16 and, through the bearing ball connection, into linear movement of the screw member 18.

The jack mechanism 10 as described up to this point is known in the prior art, as exemplified by the aforementioned Beck U.S. Patent No. 3,178,958, and is characterized by a high efficiency and long wear life due to the use of the bearing ball connection in comparison with conventional thread connections, which characteristics render the mechanism particularly suitable for high speed applications. However, as there is no connection between the nut and screw members 16 and 18 other than through the bearing balls 56, a failure of the bearing ball connection either by escape of balls upon a rupture of the return tubes 58 or a fracture of the bearing balls 56 themselves will result in uncontrolled dropping of the screw member 18 through the nut member 16, causing possible damage to the load and surrounding structure, and even personal injury in some applications.

The danger of failure is compounded by the fact that there is no advance indication that failure is imminent, especially during high speed operation. In this regard, a rupture of the return tubes 58 that results in failure of the connection by escape of the bearing balls 56 from the recirculating path is not detectable in advance during operation, and once it occurs the balls 56 escape almost instantaneously, causing immediate failure. Similarly, there is no advance indication when the balls 56 are about to fracture as the balls do not wear uniformly, but rather wear by pitting that does not noticeably increase the clearance or backlash in the connection, and once the pitting wear is sufficient to cause fracture of some of the balls the load is then concentrated on the remaining balls, subjecting them to greater shear stress and thereby accelerating the fracture development to the extent that complete failure of the connection occurs rapidly before the danger of imminent failure can normally be detected.

It is this problem of dangerous breakdown of the jack mechanism 10 upon failure of the bearing ball connection that is obviated by the present invention, which provides a safety feature whereby the nut and screw members 16 and 18 remain drivingly connected after failure of the bearing ball connection so that the screw member 18 will not drop uncontrollably through the nut member 16 and cause damage to the load and surrounding structure and possible personal injury.

This safety feature of the present invention is obtained by an interior projection formed on the nut member and projecting into the screw member groove to provide a connection between the nut and screw members upon failure of the bearing ball connection, with the projection being disposed at a clearance with respect to the screw member during proper functioning of the bearing ball connection so as not to diminish the high operating efficiency thereof.

In the illustrated preferred embodiment of the present invention this safety projection is in the form of a helical rib 62 formed on the interior surface of an axial extension 64 of the gear component 44 of the nut member 16. This rib 62 is helically aligned with and projects into the screw member groove 52 to engage the screw member 18 when the bearing ball connection fails, thereby providing a threaded connection between the nut and screw members 16 and 18 that retains the screw member 18 in the nut member 16 and that functions to transmit rotation of the nut member 16 into linear movement of the screw member 18 for continued operation of the jack mechanism 10. As this projecting rib 62 provides a threaded connection, the efficiency of the continued operation will be substantially less than the efficiency of the prior bearing ball connection operation, which lessened efficiency will result in a slowdown of the operation of the mechanism and thereby provide a readily apparent indication of the bearing ball connection failure.

As illustrated in FIGS. 3 and 4, the helical rib 62 extends for several revolutions around the interior of the gear component axial extension 64 to provide adequate strength and stability for support of the screw member 18 and load when the rib is in engagement with the screw member 18; and the rib 62 is generally semicircular in cross-section, being generally concentric with, but having a slightly smaller radius than, the semicircular cross-section of the screw member groove 52 so that the rib 62 may be disposed at a slight clearance with respect to the surface of the screw member 18 during normal functioning of the ball bearing connection and yet will mesh smoothly therewith when the ball bearing connection fails and the screw member 18 moves downwardly into operating engagement with the rib 62.

The clearance between the rib 62 and the screw member 18 should be sufficient to avoid any efficiency diminishing contact between the rib 62 and screw member 18 during normal functioning of the bearing ball connection, but should not be so large as to reduce the size of the rib 62 beyond that necessary to support the maximum load for which the jack mechanism 10 is designed when the rib 62 supports the screw member 18 and load upon failure of the bearing ball connection. The amount of clearance may be varied between these limits. As an example, satisfactory results have been obtained with a clearance of 0.015". A substantially greater clearance is shown in the drawings for clarity of illustration.

As illustrated in FIG. 3, the helical rib 62 is spaced axially from the helical cavity 54 formed by the complementary nut and screw member grooves 50 and 52, with the spacing being equivalent to a multiple of the pitch of these grooves so that the rib 62 will be centered in the screw member groove 52 at the proper clearance therewith. This desired spacing is obtained by axial adjustment of the gear component axial extension 64 with respect to the main body of the gear component 44, for which purpose the axial extension is formed with an enlarged, annular, exteriorly threaded head portion 66 at its upper end, which head portion 66 is threadably seated in an annular, downwardly facing, interiorly threaded recess 68 in the main body of the gear component 44. Upon initial assembly, the head 66 of the axial extension 64 is threaded into the gear component recess 68 until the rib 62 is positioned to obtain the proper clearance with respect to the screw member groove 52, a vertical bore 70 is then drilled into the threaded connection and a lock pin 72 is forced into the bore 70 to lock the axial extension 64 in place.

As there is no increase in the operating clearance in the bearing ball connection during use, the rib 62 will remain in proper disposition throughout the entire wear life of the jack mechanism 10 without requiring any subsequent take-up adjustment.

In some applications it may be desirable to adjust the position of the helical rib 62 so that it will function to eliminate substantially any slight backlash that may be present in the bearing ball connection. This anti-backlash feature can be obtained by adjusting the position of the axial extension 64 with respect to the main body of the gear component 44 so that the rib 62 is disposed with the aforementioned clearance at one side of the screw member groove 52 and with the rib 62 closely adjacent the other side of the screw member groove 52, whereby the rib 62 does not contact the screw member 18 during operation of the mechanism 10 in one direction, preferably the direction in which the mechanism normally operates under greatest load, but does engage the screw member 18 when the mechanism 10 is operated in the other direction, thereby minimizing backlash when the direction of operation is reversed. This results in a reduction of the operating efficiency during operation in the direction in which the rib 62 engages the screw member 18, but as this is preferably the direction in which the mechanism 10 is under lightest load, this reduction in efficiency may not be as important as the reduction in backlash.

Figure 5:
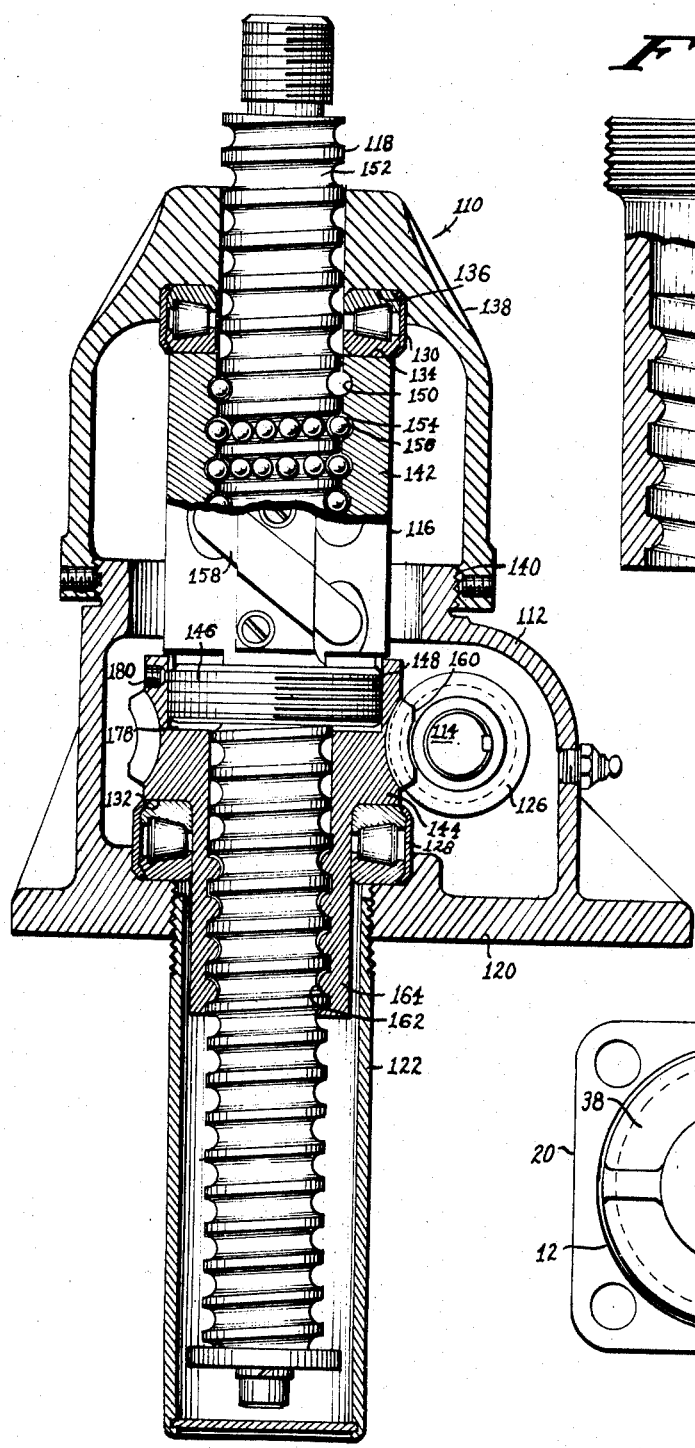
FIG. 5 is a view similar to FIG. 3 and illustrating a variation of the construction of the gear component of the jack mechanism of FIG. 3.
Figure 2:
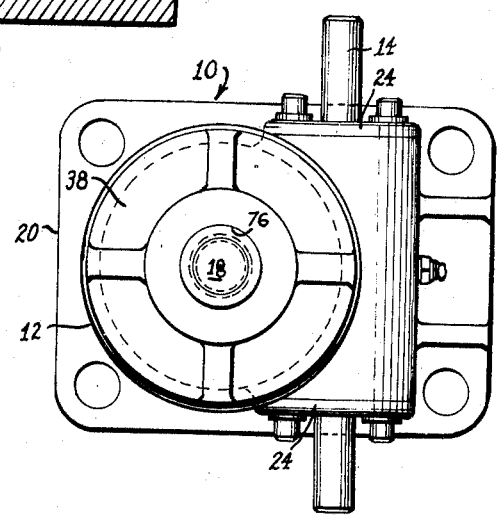
FIG. 2 is a plan view of the jack mechanism of FIG. 1.

Such an anti-backlash disposition of the rib is illustrated in the variation of the preferred embodiment illustrated in FIG. 5, wherein it is seen that the rib 162 is disposed with the clearance at the upper side of the screw member groove 152 and with the rib 162 closely adjacent the lower side of the screw member groove 152. Thus, when a load is being raised by the mechanism 110 the upwardly directed lifting thrust of the nut member 116 will be applied to the upper side of the screw member groove 152 through the bearing balls 156 without efficiency diminishing engagement of the screw member 118 by the helical rib 162 due to the clearance therebetween. However, upon reversal of the direction of operation of the mechanism 110 for lowering, the operating thrust of the nut member 116 will be directed downwardly against the lower side of the screw member groove 152, and as the rib 162 is disposed closely adjacent the lower side of the screw member groove 152 it will be the rib 162 that makes driving connection with the screw member 118, thereby minimizing the possibility of backlash from any clearance in the bearing ball connection.

In the variation of the preferred embodiment illustrated in FIG. 5, the axial extension 164 on which the rib 162 is formed is an integral extension of the gear component 144, rather than being threadably connected thereto as in the embodiment of FIG. 3, and disposition of the rib 162 for either full clearance operation or for anti-backlash operation is obtained by adjustment of the threaded connection between the nut component extension 146 and the recess 148 in the top of the gear component 144. To allow for this adjustment a clearance 178 is normally provided at the lower end of this connection and a set screw 180 is used to engage the threaded connection and releasably retain the parts in adjusted relation.

Other than for this clearance 178 and the integral formation of the axial extension 164, the construction of the variation of FIG. 5 is identical to the construction of the embodiment of FIG. 3 and, therefore, requires no independent detailed description. For the purpose of identification, the elements of the variation of FIG. 5 are identified by numerals corresponding to those of FIG. 3, but of the 100 series.

This anti-backlash disposition of the rib 62 and 162 will also serve in some circumstances to provide a no-back drag between the nut and screw members 16, 116 and 18, 118 during normal bearing ball connection operation. Thus, the proximity of the rib 62 and 162 to the surface of the lower side of the screw member groove 52 and 152 may be adjusted to impose a drag between the rib 62 and 162 and screw member 18 and 118 sufficient to prevent a run-down of the nut member 16 and 116 during a condition when the load and screw member 18 and 118 are supported exteriorly and the jack mechanism 10 and 110 is not supported otherwise.

In both the embodiment of FIG. 3 and the variation of FIG. 5, an interior, annular screw guiding surface 74 and 174 of the type disclosed in the aforementioned Beck U.S. Patent No. 3,178,958 is incorporated in the gear component 44 and 144 adjacent the helical rib 62 and 162 and directly thereabove. This screw guiding and stabilizing surface 74 and 174 is axially aligned with the bearing ball 56 and 156 cavity and the helical rib 62 and 162 closely adjacent the surface of the screw member 18 and 118 for guiding and stabilizing the screw member 18 and 118 in proper axial alignment with respect to the nut member 16 and 116, which is particularly advantageous in maintaining stability of the screw member 18 and 118 after the bearing ball connection fails and connection is provided solely by the helical rib 62 and 162.

In the embodiment of FIG. 3, and as also illustrated in FIG. 4, this screw guiding and stabilizing surface 74 is formed in the axial extension 64 of the gear component 44, whereas in the integral gear component variation of FIG. 5 this screw guiding and stabilizing surface 174 is formed in the gear component 144 itself.

Also in the same manner as in the aforementioned Beck U.S. Patent No. 3,178,958, the bore 76 and 176 of the housing shell cap portion 38 and 138 serves as a further guiding and stabilizing surface to enhance the stability of the screw member 18 and 118 during operation.

It should be understood that the present invention has been described in detail hereinabove for the purpose of illustration only, and is not intended to be limited thereby or otherwise except as defined in the appended claims.

I claim:

1. A nut and screw mechanism comprising a screw member having an exterior, helical groove, a nut member having an interior, helical groove that complements said screw member groove to provide therewith a helical cavity for retention of bearing elements therein, and a plurality of bearing elements disposed in said helical cavity for drivingly connecting said nut and screw members to transform rotational movement of one of said members into linear movement of the other of said members, said nut member having an interior projection aligned with and projecting into said screw member groove to provide a connection between said members upon failure of the connection provided by said bearing elements, said projection being disposed at a clearance with respect to the surface of said screw member during proper functioning of said bearing elements so as not to diminish the operating efficiency of said bearing element connection.

2. A nut and screw mechanism according to claim 1 and characterized further in that said nut member projection is disposed with the clearance at one side of said screw member groove, whereby said projection does not contact the screw member during operation of the mechanism in one direction and, therefore, does not diminish the operating efficiency of the bearing element connection during operation in said one direction, and said projection is disposed closely adjacent the other side of said screw member groove for engagement of the screw member during operation of the mechanism in the other direction, thereby minimizing backlash when the operation of the mechanism is reversed from said one to said other direction.

3. A nut and screw mechanism according to claim 2 and characterized further in that said nut member projection is disposed so that said one direction is the direction in which said mechanism normally operates under greatest load.

4. A nut and screw mechanism according to claim 1 and characterized further in that said nut member projection is spaced axially from said helical cavity.

5. A nut and screw mechanism according to claim 4 and characterized further in that said nut member is compositely formed and comprises one component having said interior, helical groove formed therein, and another component having said interior projection formed thereon.

6. A nut and screw mechanism according to claim 5 and characterized further in that said components are secured together to form said composite nut member.

7. A nut and screw mechanism according to claim 5 and characterized further in that said components are secured together to disposed said nut member projection with the clearance at one side of said screw member groove, whereby said projection does not contact the screw member during operation of the mechanism in one direction and, therefore, does not diminish the operating efficiency of the bearing element connection during operation in said one direction, and with said projection disposed closely adjacent the other side of said screw member groove for engagement of the screw member during operation of the mechanism in the other direction, thereby minimizing backlash when the operation of the mechanism is reversed from said one to said other direction.

8. A nut and screw mechanism according to claim 1 and characterized further in that said nut member projection is an interior, helical rib extending in helical alignment with said screw member groove.

9. A nut and screw mechanism according to claim 8 and characterized further in that said helical rib is disposed with the clearance at one side of said screw member groove, whereby said helical rib does not contact the screw member during operation of the mechanism in one direction and, therefore, does not diminish the operating efficiency of the bearing element connection during operation in said one direction, and said helical rib is disposed closely adjacent the other side of said screw member groove for engagement of the screw member during operation of the mechanism in the other direction, thereby minimizing backlash when the operation of the mechanism is reversed from said one to said other direction.

10. A nut and screw mechanism according to claim 8 and characterized further in that said helical rib is spaced axially from said helical cavity.

11. A nut and screw mechanism according to claim 10 and characterized further in that said nut member is compositely formed and comprises one component having said interior, helical groove formed thereon, and another component having said interior, helical rib formed thereon.

12. A jack mechanism comprising a housing, a nut member rotatably mounted in said housing and having an exterior, annular gear surface, means engaging said gear surface for rotating said nut member, a screw member extending axially through said nut member and from said housing, said screw member having an exterior, helical groove, said nut member having an interior, helical groove that complements said screw member groove to provide therewith a helical cavity for retention of bearing elements therein, and a plurality of bearing elements disposed in said helical cavity for drivingly connecting said nut and screw members to transform rotational movement of said nut member into linear movement of said screw member, said nut member having an interior, helical rib helically aligned with and projecting into said screw member groove to provide a connection between said members upon failure of the connection provided by said bearing elements, said helical rib being disposed at a clearance with respect to the surface of said screw member during proper functioning of said bearing elements so as not to diminish the operating efficiency of said bearing element connection.

13. A jack mechanism according to claim 12 and characterized further in that said helical rib is spaced axially from said helical cavity.

14. A jack mechanism according to claim 13 and characterized further in that said nut member has an interior, annular, screw guiding surface axially aligned with said helical cavity and said helical rib for guiding and stabilizing said screw member in proper axial alignment with respect to said nut member.

15. A jack mechanism according to claim 13 and characterized further in that said nut member is compositely formed and comprises a nut component having said interior, helical groove formed thereon, and a gear component having said exterior, annular gear surface and said interior, helical rib formed thereon.

16. A jack mechanism according to claim 15 and characterized further in that said gear component has an interior, annular screw guiding surface axially aligned with said helical cavity and said helical rib for guiding and stabilizing said screw member in proper axial alignment wth respect to said nut member.

17. A jack mechanism according to claim 15 and characterized further in that said nut component and said gear component are threadably connected to permit axial adjustment of said gear component with respect to said nut component to dispose said helical rib with the clearance at one side of said screw member groove, whereby said rib does not contact the screw member during operation of the mechanism in one direction and, therefore, does not diminsh the operating efficiency of the bearing element connection during operation in said one direction, and said rib is disposed closely adjacent the other side of said screw member groove for engagement of the screw member during operation of the mechanism in the other direction, thereby minimizing backlash when the operation of the mechanism is reversed from said one to said other direction.

18. A jack mechanism according to claim 13 and characterized further in that said helical rib is formed on an axial extension of said nut member with said extension being threadably connected to said nut member to permit proper positioning of said helical rib with respect to said helical cavity.

19. A jack mechanism according to claim 18 and characterized further in that said nut member extension has an interior, annular, screw guiding surface axially aligned with said helical cavity and said helical rib for guiding and stabilizing said screw member in proper axial alignment with respect to said nut member.

References Cited

UNITED STATES PATENTS

| 3,176,963 | 4/1965 | Sturm | 74—424.8 X |
| 3,187,601 | 6/1965 | Glenn | 74—424.8 |
| 3,304,794 | 2/1967 | Bird | 74—409 |

LEONARD H. GERIN, Primary Examiner

U.S. Cl. X.R.

74—409, 441